United States Patent Office 3,431,248
Patented Mar. 4, 1969

3,431,248
PROCESS FOR PRODUCING CONJUGATED DIOLEFIN POLYMERS HAVING HIGH REGULARITY WITH A Co- OR Ni-CHELATE COMPOUND/ORGANOALUMINUM HALIDE CATALYST
Shu Kanbara, Akio Takahashi, Masayuki Nakano, and Toshio Hirose, Tokyo, Japan, assignors to Mitsui Chemical Industry Co., Ltd., Tokyo, Japan, a corporation of Japan
No Drawing. Filed Oct. 26, 1964, Ser. No. 406,963
Claims priority, application Japan, Oct. 30, 1963, 38/61,614
U.S. Cl. 260—94.3    18 Claims
Int. Cl. C08d 1/14, 1/16

---

ABSTRACT OF THE DISCLOSURE

A process for producing a high molecular weight homo- or co-polymer of high regularity which comprises polymerizing conjugated diolefins with a catalyst system containing a Co or Ni metal chelate (the ligand is a cyclic compound and at least one of the carbon atoms which constitute the ring of the cyclic compound takes part in the chelate ring) and an organoaluminum halide.

---

This invention relates to a catalyst composition and a method for polymerizing or copolymerizing conjugated diolefines therewith. More particularly, this invention relates to a catalyst composition consisting of (a) an organoaluminum halide and (b) a metal chelate compound and to a method for polymerizing at least one conjugated diolefine, particularly butadiene, with the above-mentioned catalyst composition, the metallic ion of said metal chelate compound being selected from the group consisting of cobalt and nickel ions, and the ligand of said metal chelate compound being formed of a chelating agent having a member selected from the group consisting of aromatic and heterocyclic rings at least one carbon atom of which ring participates in the formation of the chelate ring of said chelate compound, and electron donor atoms of said chelating agent being selected from the group consisting of (1) a pair comprising two oxygen atoms, (2) a pair comprising one nitrogen atom and one oxygen atom (3) two pairs, each comprising one nitrogen atom and one oxygen atom and (4) a pair comprising one nitrogen atom and one sulfur atom.

As regards catalyst compositions for producing a high molecular weight polymer having relatively high cis-1,4 content by polymerizing butadiene, there have been known combinations of organoaluminum halides and cobalt or nickel compounds. It has also been known that among such combinations, a soluble catalyst composition containing a cobalt compound affords especially high effectiveness. However, no catalyst composition prepared from the above-mentioned metal chelate compound has ever been known.

An object of the present invention is to provide a catalyst composition which is effective for the production of high molecular weight polymers having structures of extremely high regularity by polymerizing conjugated diolefines, particularly 1,3-butadiene. Another object of the present invention is to provide a method for producing a high molecular weight polymer having high structural regularity by the polymerization of a conjugated diolefine, particularly 1,3-butadiene.

It has now been discovered that these and other objects may be accomplished by the catalyst composition of the present invention which contains a metal chelate compound as an effective constituent for polymerizing conjugated diolefines, particularly butadiene, together with an organoaluminum halide.

The metal chelate compound used in the present invention is characterized in that it contains an aromatic or heterocyclic ring and at least one carbon atom of this ring participates in the formation of the chelate ring. Since said chelate compound is stable against moisture, oxygen and heat, it is easy to handle and can be weighed precisely. These advantages afford good reproducibility in the polymerization with a catalyst containing a metal chelate compound.

Since the chelate compound and the catalyst composition prepared therefrom are generally soluble in inert hydrocarbons which comprise polymerization media, they are highly effective for the polymerization of conjugated diolefines, particularly butadiene. In other words, the amount of the catalyst necessary to obtain a sufficient polymerization velocity is surprisingly small. One mol of such a chelate compound is able to polymerize 50,000 mols of customary rubber grade butadiene. Furthermore, the catalyst prepared from such a chelate compound affords high molecular weight polybutadiene having substantially all cis-1,4 structure and no gel fraction.

Metal chelate compounds are to be understood as substances in which the metal atom is combined with one or more pairs of electron donor atoms by principal and auxiliary valencies in one molecule. As regards such compounds, a detailed description can be found, e.g., in A. E. Martell and M. Calvin, "Chemistry of the Metal Chelate Compounds," Prentice-Hall, Inc., New York (1952).

According to said description, a metal chelate compound is produced, regardless of mode of bond, according to the following equation:

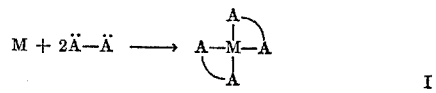

I wherein M means a metal ion, Ä—Ä means a chelating agent, and Ä means an electron donor atom capable of joining to the metal ion M by principal and auxiliary valencies.

is a ligand, the number of which is determined by the valency of M. Hence these metal chelate compounds can be expressed by the general formula:

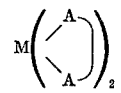

in the case of bi-valent metal ion or

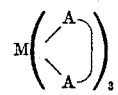

in the case of tri-valent metal ion. The chelate ring of the metal chelate compound is a ring formed by the combination of M and

in the above-mentioned Formula I.

The metal chelate compounds used in the present invention have the above-mentioned general Formula I in which M is either cobalt or nickel, and the chelating agent Ä—Ä participating in the formation of the ligand possesses at least one aromatic or heterocyclic ring, at least one carbon atom of said ring participates in the formation of the chelate ring, and Ä is an atom selected from oxygen, nitrogen and sulfur atoms so that the chelating agent does not contain any one of the pairs of comprising two nitrogen atoms, two sulfur atoms or one oxygen atom and one sulfur atom. Further, metal chelate compounds expressed by the formula on the right side of the following equation, and derived from a metal compound and a chelating agent possessing two pairs, each comprising one oxygen atom and one nitrogen atom in its molecule as electron donor atoms, may be used as the chelating compound of the present invention:

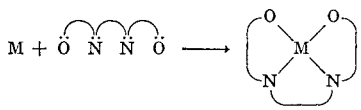
II wherein M is a cobalt or nickel ion and

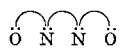

is a chelating agent.

Though the chelate compound used in the present invention may contain principally a bi-valent or tri-valent cobalt ion or a bi-valent nickel ion, those which contain cobalt ion are preferable because they afford high molecular weight polymers.

As cobalt and nickel compounds for preparing said metal chelate compounds, salts which are readily obtainable, such as cobaltous chloride, cobaltous acetate, nickel chloride, and nickel acetate, may be used.

Chelating agents which participate in the formation of the metal chelate compound used in the present invention can be illustrated as follows:

(A) Chelating agents which form the metal chelate compounds corresponding to the formula on the right side of the general Equation I:

(1) Chelating agents possessing an aromatic ring substituted with an oxygen-containing radical capable of being joined with a metal ion and possessing, as an electron donor, a nitrogen atom in the position which is apart from the abovementioned radical by 2 or 3 carbon atoms including at least one carbon atom of said aromatic ring:

Salicylaldehydeimine, salicylaldehyde methylimine, salicylaldehyde phenylimine, salicylaldehyde benzylimine, 8-hydroxy quinoline, 5-methyl-8-hydroxyquinoline, 10-hydroxybenzoquinoline, 1-hydroxyphenazine, salicylaldoxime, 2 - hydroxy - 1-acetophenoneoxime, phenanthrene monooxime, o-nitrosophenol, α-nitroso-β-naphthol, anthranilic acid, 3-amino-2-naphthoic acid, quinaldinic acid, phenazine-α-carboxylic acid, 2-benzeneazophenol, 4-methyl-2-benzene-azophenol, 9-(m-tolylazo)-10-phenanthrol, o-hydroxybenzylamine, 4-methyl-2-benzene azophenol.

(2) Chelating agents possessing an aromatic ring substituted with an oxygen-containing radical capable of being joined with a metal ion and possessing, as an electron donor, another oxygen atom in the position which is apart from the abovementioned radical by 2 or 3 carbon atoms including at least one carbon atom of said aromatic ring:

Salicylaldehyde, α-hydroxyacetophenone, o-vanillin, 2-hydroxy - 1 - naphthaldehyde, 5-hydroxynaphthoquinone, alizarin, quinizarin, naphthazarin, tropolone, hinokitiol, pyromeconic acid, kojic acid, hydroxyxanthone.

(3) Chelating agents possessing an aromatic or heterocyclic ring substituted with a sulfur-containing radical capable of being joined with a metal ion and possessing, as an electron donor, a nitrogen atom in the position which is apart from the above-mentioned radical by one or two carbon atoms including at least one carbon atom of said ring:

2-mercaptobenzoxazole, 2-mercaptobenzimidazole, 2-mercaptobenzothiazole, 2-mercapto-4H-3,1-benzothiazine, 2-mercapto-4H-3,1-benzoxazine, thiosaccharin, 2-mercaptopyridine, 2-mercaptopyrimidine, 8-mercaptoquinoline, 2-thiouracil, 4-thiouracil, thiopental, thiobarbituric acid, mercapto thioketothiodiazole, mercaptophenylthiothiodiazolone, 3-thiourazole, mercaptotetrazole, mercaptopurine.

(B) Chelating agents which form the metal chelate compounds corresponding to the formula on the right side of the general Equation II, wherein the adjacent O and N are situated apart from each other by carbon atoms including 2 carbon atoms of an aromatic ring, and the two N atoms adjacent are linked through a hydrocarbon radical:

Bis(salicylaldehyde)ethylenediimine, bis(salicylaldehyde)-o-phenylenediimine, bis(salicylaldehyde)-m-phenylenediimine, bis(salicylaldehyde)decamethylenediimine, bis(salicylaldehyde)-β-methyltetramethylenediimine.

The above-mentioned chelate compounds are readily available or can be synthetized by a conventional chemical method.

The metal chelate compounds used in the present invention can be prepared readily from said chelating agents and cobalt or nickel salts by procedure well known in quantitative analysis.

In this specification and the attached claims, these metal chelate compounds will be hereinafter referred to as "bis (chelating agent) metal$^{II}$ or tris(chelating agent) metal$^{III}$" for the purpose of specifying them. For example, a chelate compound prepared from cobaltous salt and salicylaldehydeimine will be referred to as "bis(salicylaldehydeimine) Co$^{II}$."

These metal chelate compounds are stable in air, non-hygroscopic in nature, and soluble in reaction diluents, particularly in aromatic hydrocarbons.

The amount of the metal chelate compound used can be varied over a relatively wide range. Though its optimum amount varies with the kind and the purity of monomer and reaction diluent, and other polymerization condition, it is generally in the range of 0.05 to 3 mmols per l. of the reaction diluent.

The other constituent of the catalyst composition of the present invention, organoaluminum halide, is an aluminum halide having at least one hydrocarbon radical combined with aluminum through the C—Al bond and the hydrocarbon radical is e.g., an alkyl or aryl radical which has one to eight carbon atoms, for example, methyl, ethyl, propyl, n-butyl, iso-butyl, n-octyl, 2-ethyl-hexyl and phenyl. One of the hydrocarbon radicals may be combined with aluminum through an oxygen atom so as to form alkoxy or aryloxy linkage. The halogen atoms participating in the formation of the organoaluminum halide are preferably chlorine and bromine. The preferred examples of the organoaluminum halides used in this invention are diethylaluminum chloride or bromide, ethylaluminum dichloride, ethylaluminum sesquichloride and ethyl-ethoxyaluminum chloride.

The amount of the organoaluminum compound can also be varied over a wide range, but the moles therefore generally from 2 to 300 times the number of moles of the metal chelate compound. Its optimum amount varies according to the monomer. For example, when the monomer is butadiene, it is in the range of 30 to 250 times the amount of the metal chelate compound and when the monomer is isoprene or 1,3-pentadiene, it is near the lower limit.

The preparation of the present catalyst is simple: All that is necessary is to mix the catalyst constituents in a hydrocarbon diluent. The order of addition of each catalyst constituent is optional. In other words, a metal chelate compound can be added to an organoaluminum halide in a diluent or the reverse order may be adopted. The catalyst may be prepared in the presence of a monomer, but it is also possible to introduce a monomer after the catalyst preparation. The catalyst thus prepared or the total amount of each constituent of the catalyst may be added to the polymerization system all at once, but intermittent or continuous addition over the total period of polymerization time is an alternative. If necessary, it is possible to add the monomer to the polymerization system slowly.

When conjugated diolefines are polymerized in the presence of the novel catalyst composition of the present invention, the polymerization is, in general, directed to 1,4-addition and especially in the case of butadiene, a polymer containing more than 99 percent of cis-1,4-structure is generally obtained. Such conjugated diolefines include 1,3-butadiene, i.e., a member having the simplest constitution; isoprene and 1,3-pentadiene, i.e., a methyl derivative thereof; and 1,3-butadiene derivatives substituted by higher alkyl groups. These diolefines can be polymerized or copolymerized readily by the method of the present invention.

The polymerization of the present invention can be carried out at a temperature of lower than 150° C. It does not require outside pressure but proceeds at an antogenous pressure. If required, the polymerization can be carried out in a stream of an inert gas. Any type e.g. batch type and continuous type, of polymerization may be adopted. When a gaseous monomer is used, it is possible to carry out polymerization while bubbling the monomer into the reaction system. If necessary, bulk polymerization may be applied, but the type of solution polymerization carried out generally in the presence of an inert reaction diluent is preferable with respect to reaction operation and quality of product. In such a case, any kind of diluent may be used so long as it is inactive to the monomer, the catalyst or the resulting polymer. For example, aromatic hydrocarbons, such as benzene and, toluene; aliphatic hydrocarbons such as n-hexane and, n-heptane; alicyclic hydrocarbons, such as cyclohexane; halogenated derivatives thereof, such as monochlorobenzene and dichlorobenzene, are illustrative. Among these reaction diluents, aromatic hydrocarbons are preferable since they allow the reaction to be carried out in a homogenous system. However, in some cases, a mixture thereof with a suitable proportion of an aliphatic or alicyclic hydrocarbon is used. The amount of the reaction diluent can be varied over a wide range. In order to facilitate the reaction operation, it is desirous to select the amount of the reaction diluent so that the concentration of the resulting polymer in the reaction diluent is less than 30 wt. percent. In the case of butadiene, it is preferably less than 20 wt. percent.

The polymerization temperature can be selected over a wide range, but it is generally selected in the range of −50° C. to 150° C., preferably −20° C. to 100° C.

The following examples are given to illustrate the present invention but it will be understood that they are merely illustrative and are not intended to limit the scope of the invention.

As regards microstructures of the polymers produced in these examples, a method of infra-red spectroscopy according to R. S. Silas, J. Yates, V. Thornton, Anal., Chem., 31, 529 (1959), was adopted for polybutadiene, and the following literature was referred to for determining microstructures and compositions of polymers of isoprene and 1,3-pentadiene and copolymers of these dienes with butadiene:

W. S. Richardson and A. Sacher, J. Polymer Sci., 10, 353 (1953);

L. Porri, A. Carbonaro and F. Ciampelli, Kakromol, Chem., 61, 90 (1963).

Molecular weights are indicated by intrinsic viscosities ($\mu$) as measured in benzene at a temperature of 30° C.

Example 1

The polymerization of butadiene was carried out in the presence of a catalyst composition consisting of bis(8-hydroxyquinoline)$Co^{II}$ and diethylaluminum chloride.

A sufficiently dried three-necked separable flask equipped with a stirrer was flashed with de-moistured nitrogen, 0.16 mmol of bis(8-hydroxyquinoline)$Co^{II}$ was precisely weighed and introduced therein and 800 ml. of purified toluene containing 1 mmol of water was added. The resulting mixture was a pale yellow solution containing a trace of insoluble matter.

This mixture was cooled at a temperature of 10° C. and then 48.1 of butadiene gas (purity 99 percent) was bubbled into and absorbed in this mixture. 8 ml. of toluene containing 16 mmol of diethyl aluminum chloride were added, and the polymerization was started. As soon as diethyl aluminum chloride solution was added, the reaction system become a completely homogenous mixture, slightly yellowish red in color, then gradually increasing in viscosity and ultimately turning into extremely viscous liquid. The reaction system was maintained at a temperature of 10° C. to 20° C. during the polymerization period. After 90 minutes from starting the reaction, 50 ml. of methanol containing 2,6-dibutyl-4-hydroxytoluene (Ionol) in an amount of 2 g. per liter was added and the polymerization was stopped. Then to a large amount of above-mentioned methanol solution maintained at vigorously agitated state, the above-mentioned viscous reaction mass was added, drop by drop to precipitate polymer. Precipitated polymer was filtered and subjected to vacuum drying at a temperature of 50° C., whereby 112 g. of extremely elastic, white solid polymer was obtained. The characteristic properties of this polymer were as follows:

$[\mu]=3.27$

|  | Mol percent |
| --- | --- |
| Cis-1,4 structure | 99.1 |
| Trans-1,4 structure | 0.5 |
| 1,2-vinyl structure | 0.4 |

Example 2

A glass reaction tube, flashed with de-moistured nitrogen was cooled in an ice bath, and then charged with bis(8-hydroxyquinoline)$Co^{II}$, 35 ml. of toluene and diethyl-aluminum chloride in this order. After bubbling butadiene gas into the reaction mixture at a rate of about 100 ml./min. for 20 minutes, the feed of butadiene was stopped, but the polymerization was continued further for a definite time under the stream of nitrogen while stirring a reaction mixture. The reaction was carried out in an ice bath all the time. According to the variations of the amount of bis(8-hydroxyquinoline)$Co^{II}$, the mol ratio of diethyl aluminum chloride vs. bis(8-hydroxyquinoline)$Co^{II}$, and the total reaction time, the yields, the intrinsic viscosities and the microstructures of the polymers obtained are illustrated in Table 1.

TABLE I

| Run No. | Co-chelate Compound (mmol) | [Al]/[Co] (mol ratio) | Total reaction time (min.) | Polymer Yield (g.) | $[\mu]$ | Microstructure, mol percent | | |
| --- | --- | --- | --- | --- | --- | --- | --- | --- |
|  |  |  |  |  |  | Cis-1,4 | Trans-1,4 | 1,2-Vinyl |
| 1 | 0.035 | 70 | 30 | 4.2 | 3.28 | 99.3 | 0.5 | 0.2 |
| 2 | 0.025 | 100 | 30 | 3.0 | 2.34 | 99.1 | 0.5 | 0.4 |
| 3 | 0.020 | 120 | 40 | 3.5 | 3.30 | 99.1 | 0.5 | 0.4 |
| 4 | 0.012 | 100 | 60 | 4.4 | 4.44 | 99.5 | 0.3 | 0.2 |

Example 3

After flashing a glass tube with de-moistured nitrogen, bis(salicylaldehyde)$Co^{II}$ and 35 ml. of toluene were charged into a flask and the flask was cooled in an ice bath. Diethylaluminumchloride was added finally. After introducing butadiene at a rate of 100 ml./min. for 20 minutes, the feed of butadiene gas was stopped but the polymerization was continued for a definite period of time.

The amounts of Co-chelate compound used, the mol ratios of Al to Co, the total reaction time at a temperature of ice bath (including the time from the start of butadiene feed to the completion of reaction), the polymer yields, the intrinsic viscosities and the microstructures are shown in Table 2.

TABLE 2

| Run No. | Co-chelate Compound (mmol) | [Al]/[Co] (mol ratio) | Total reaction time (min.) | Polymer Yield (g.) | $[\mu]$ | Microstructure, mol percent | | |
|---|---|---|---|---|---|---|---|---|
| | | | | | | Cis-1,4 | Trans-1,4 | 1,2-Vinyl |
| 1 | 0.035 | 70 | 60 | 4.19 | 2.90 | 99.5 | 0.3 | 0.2 |
| 2 | 0.025 | 100 | 60 | 4.75 | 2.80 | 99.0 | 0.6 | 0.4 |
| 3 | 0.020 | 100 | 110 | 4.11 | 3.35 | 99.3 | 0.4 | 0.3 |
| 4 | 0.020 | 150 | 60 | 4.29 | 2.60 | 99.1 | 0.5 | 0.4 |

Example 4

Using, as a chelate compound, bis(mercaptobenzimiazole)Co$^{II}$ and at a total reaction time of 1 hour, the same general procedure as in Example 2 was repeated to polymerize butadiene. The result is shown in Table 3.

TABLE 3

| Run No. | Co-chelate compound (mmol) | [Al]/[Co] (mol ratio) | Polymer yield (g.) | $[\mu]$ | Microstructure, mol percent | | |
|---|---|---|---|---|---|---|---|
| | | | | | Cis-1,4 | Trans-1,4 | 1,2-Vinyl |
| 1 | 0.030 | 100 | 4.5 | 1.17 | 97.6 | 1.3 | 1.1 |
| 2 | 0.020 | 100 | 3.9 | 2.87 | 99.2 | 0.4 | 0.4 |
| 3 | 0.020 | 50 | 4.5 | 3.09 | 98.8 | 0.7 | 0.5 |
| 4 | 0.015 | 100 | 4.5 | 4.06 | 99.5 | 0.3 | 0.2 |
| 5 | 0.015 | 70 | 4.2 | 4.22 | 99.3 | 0.4 | 0.3 |
| 6 | 0.010 | 150 | 3.6 | 4.27 | 99.2 | 0.5 | 0.3 |

Example 5

The results of polymerization of butadiene with a catalyst system consisting of one of the various cobalt and nickel chelate compounds and diethyl aluminum chloride are shown in Table 4. The same general procedure as in Example 2 was repeated for polymerization except that definite amounts of metal chelate compound and diethyl aluminum chloride were used. Butadiene gas was introduced into the polymerization system cooled in an ice bath at a gas rate of 180 ml./min. for 20 minutes in run Nos. 15 and 16, at a gas rate of 100 ml./min. for 30 minutes in run Nos. 2 and 7 and at a gas rate of 100 ml./min. for 20 minutes in the other experiments.

Soluble catalysts were formed as soon as diethyl aluminum chloride was added, but in run No. 5, the catalyst was not formed at a cooling temperature of the ice bath. Reddish violet soluble catalyst was formed when stirring was continued at room temperature for a while. In run No. 4, tris($\alpha$-nitroso-$\beta$-naphthol)Co$^{III}$ dissolved in toluene by itself, showing red color, but as soon as diethyl aluminum chloride was added, characteristic dark green complex was formed.

(Al$_2$Et$_3$Cl$_3$) were added. After feeding butadiene at a rate of 100 ml./min. for 20 minutes, the polymerization was continued for 50 minutes. 0.95 g. of polymer were obtained after the same treatment as in Example 1. This corresponds to about 21 percent conversion based on the butadiene feed. Resultant polybutadiene has the following properties: $[\mu]=1.79$, microstructure of polymer, cis-1,4 98.9 mol percent, trans-1,4 0.9 mole percent, 1,2-vinyl 0.2 mol percent.

Example 7

Using 0.015 mmol of bis(mercaptobenzimidazole)Co$^{II}$, as a chelate compound, and 1.50 mmol of ethyl aluminum sesquichloride as an organoaluminum halide, the polymerization of butadiene was carried out at room temperature for 2 hours by the same procedure as in Example 2. The resulting polymer was 1.48 g.; conversion was about 33 percent; and the properties of the polymer were as follows:

$$[\mu]=3.76$$

| Microstructure: | Mol percent |
|---|---|
| Cis-1,4 | 98.3 |
| Trans-1,4 | 0.9 |
| 1,2-vinyl | 0.3 |

Example 8

Using 0.49 mmol of bis(8-hydroxyquinoline)Co$^{II}$ and

TABLE 4

| Run No. | Metal chelate compound | | [Al]/[Co] (mol ratio) | Total reaction time (min.) | Yield (g.) | $[\mu]$ | Microstructure (mol percent) | | |
|---|---|---|---|---|---|---|---|---|---|
| | Type | Amount (mmol) | | | | | Cis-1,4 | Trans-1,4 | 1,2-Vinyl |
| 1 | Bis(salicylaldehyde) ethylenediimine Co$^{II}$ | 0.030 | 82 | 60 | 3.3 | 1.70 | 99.0 | 0.5 | 0.5 |
| 2 | Bis(salicylaldoxime)Ni$^{II}$ | 0.035 | 70 | 30 | 5.9 | | | | |
| 3 | Bis(salicyladlehydeimine)Ni$^{II}$ | 0.035 | 70 | 140 | 3.3 | 0.11 | 88.5 | 11.2 | 0.3 |
| 4 | Tris($\alpha$-nitroso-$\beta$-napthol)Co$^{III}$ | 0.035 | 70 | 50 | 3.8 | 1.67 | 98.9 | 0.7 | 0.4 |
| 5 | Bis(anthranilic acid)Co$^{II}$ | 0.035 | 70 | 140 | 2.8 | 1.16 | 96.1 | 2.7 | 1.2 |
| 6 | Bis($\alpha$-benzoinoxime)Ni$^{II}$ | 0.035 | 70 | 140 | 2.2 | 0.12 | 90.0 | 9.8 | 0.1 |
| 7 | Bis(salicylaldehydeimine)Co$^{II}$ | 0.035 | 70 | 30 | 5.7 | 3.03 | 99.1 | 0.6 | 0.3 |
| 8 | Bis(hydroxynapththoquinone)Co$^{II}$ | 0.030 | 70 | 90 | 2.45 | 2.77 | 99.5 | 0.3 | 0.2 |
| 9 | Bis(hinokitiol)Co$^{II}$ | 0.030 | 100 | 70 | 4.40 | 1.43 | 97.0 | 1.6 | 1.4 |
| 10 | Bis(2-hydroxy-1-naphthoaldehyde)Co$^{II}$ | 0.030 | 100 | 60 | 4.08 | 2.40 | 99.0 | 0.5 | 0.5 |
| 11 | Bis(kojic acid)Co$^{II}$ | 0.030 | 100 | 60 | 4.92 | 0.76 | 95.8 | 2.2 | 2.0 |
| 12 | Bis(salicylaldehyde)Ni$^{II}$ | 0.030 | 100 | 90 | 3.43 | 0.25 | 96.5 | 2.8 | 0.7 |
| 13 | Bis(alizarine)Co$^{II}$ | 0.030 | 150 | 120 | 2.56 | 2.71 | 99.0 | 0.6 | 0.4 |
| 14 | ($\alpha$-Hydroxyacetophenone)$_2$Co$^{II}$ | 0.035 | 70 | 60 | 4.53 | 2.33 | 98.8 | 0.8 | 0.4 |
| 15 | Bis(o-vanillin)Co$^{II}$ | 0.035 | 70 | 20 | 5.00 | 3.10 | 99.2 | 0.4 | 0.4 |
| 16 | Bis(quinizarin)Co$^{II}$ | 0.035 | 70 | 20 | 7.45 | 4.28 | 98.5 | 0.9 | 0.6 |
| 17 | Bis(thiouracil)Co$^{II}$ | 0.035 | 70 | ($^1$) | 2.56 | 2.31 | 99.4 | 0.3 | 0.3 |
| 18 | Bis(8-mercaptoquinoline)Co$^{II}$ | 0.020 | 100 | ($^1$) | 3.78 | 6.19 | 99.4 | 0.3 | 0.3 |
| 19 | Bis(mercaptopurine)Co$^{II}$ | 0.035 | 70 | ($^1$) | 1.80 | 3.52 | 97.3 | 1.9 | 0.8 |
| 20 | Bis(mercaptobenzothiazole)Ni$^{II}$ | 0.020 | 100 | 120 | 0.95 | 0.90 | 91.5 | 6.5 | 2.0 |
| 21 | Bis(thiobarbituric acid)Co$^{II}$ | 0.035 | 70 | ($^2$) | 1.58 | 1.95 | 95.5 | 2.5 | 2.0 |
| 22 | Bis(mercaptobenzothiazole)Co$^{II}$ | 0.020 | 100 | 60 | 4.70 | 2.29 | 97.1 | 2.0 | 0.9 |
| 23 | Bis(mercaptobenzoxazole)Co$^{II}$ | 0.020 | 100 | 60 | 4.32 | 3.38 | 99.3 | 0.4 | 0.3 |

$^1$ 20 hours. $^2$ 24 hours.

Example 6

0.025 mmol of bis(salicylaldehyde)Co$^{II}$ and 35 ml. of toluene were fed to a glass tube flashed with demoistured nitrogen in advance and, after being cooled in an ice bath, 2.50 mmol of ethylaluminum sesquichloride 2.45 mmol of ethyl aluminum dichloride, the same procedure as in Example 2 was repeated. The total reaction time was 80 minutes. The reaction system turned to light brown immediately after the addition of ethyl aluminum dichloride but gradually turned to pale blue and increased in viscosity. The properties of the resulting polybutadiene were as follows:

Polymer yield, 2.6 g.

$[\mu]=1.52$

Microstructure: Mol percent
  Cis-1,4 _____ 98.3
  Trans-1,4 _____ 1.0
  1,2-vinyl _____ 0.7

Example 9

Using 0.035 mmol of bis(mercaptobenzimidazole)Co$^{II}$ and 1.75 mmol of ethyl aluminum dichloride, the same procedure as in Example 2 was applied to the polymerization of butadiene at room temperature for 2 hours. Yield, conversion, intrinsic viscosity and microstructure of the resulting polymer were as follows:

Polymer yield, 0.81 g. (conversion 18 percent)

$[\mu]=2.91$

Microstructure: Mol percent
  Cis-1,4 _____ 97.8
  Trans-1,4 _____ 1.9
  1,2-vinyl _____ 0.3

Example 10

After being cooled in an ice bath, a reaction tube, flashed with nitrogen in advance, was charged with 0.035 mmol of bis(8-hydroxyquinoline)Co$^{II}$, 35 ml. of toluene and 2.45 mmole of ethoxyethylaluminum chloride. To this reaction system, butadiene was charged at a rate of about 100 ml./min. for 20 minutes. The polymerization was continued for an additional 70 minutes in a stream of nitrogen. The total reaction time was 90 minutes, and the reaction was carried out in an ice bath. The properties of the resulting polymer were as follows:

Polymer yield _____ g__ 2.4
Microstructure:
  Cis-1,4 _____ Mol percent__ 97.7
  Trans-1,4 _____ do____ 2.1
  1,2-vinyl _____ do____ 0.2

Example 11

After being charged with 0.035 mmol of bis(salicylaldehydeimine)Co$^{II}$ a reaction tube flashed with nitrogen, was further charged with 35 ml. of a reaction diluent having the following constituents:

Percent (wt.)
n-Heptane _____ 35.3
Methylcyclohexane _____ 25.5
i-Pentane _____ 15.0
Methyl isopentane _____ 10.5
Cyclohexane _____ 10.1
Aromatic hydrocarbon _____ 3.5
Miscellaneous _____ 0.3

After the addition of 2.45 mmol diethyl aluminum chloride to the above-mentioned mixture, butadiene was fed at a rate of about 100 ml./min. for 10 minutes. The polymerization was continued for further 2 hours. Total reaction time was 2 hours and 10 minutes and the reaction was carried out at room temperature throughout. The weight of the polymer was 2.5 g. (about 100 percent conversion). Its properties were as follows:

$[\mu]=1.35$

Mol percent
Cis-1,4 _____ 98.1
Trans-1,4 _____ 1.3
1,2-vinyl _____ 0.6

Example 12

After being cooled in an ice bath, a nitrogen-flashed reaction tube was charged with 0.025 mmol of bis(4-methyl-2-benzeneazophenol)Co$^{II}$, 35 ml. of n-heptane, and 2.5 mmol of diethyl aluminum chloride in this order. When diethyl aluminum chloride was added to a clear solution of the Co-chelate compound in heptane, red dish needle crystals were precipitated. After feeding butadiene to this reaction system at a rate of about 100 ml./min. for 20 minutes, the reaction was carried out in an ice bath. The polymer yield was 4.39 g., which corresponds to 97.6 percent conversion. The properties of the polymer were as follows:

$[\mu]=1.87$

Mol percent
Cis-1,4 _____ 99.0
Trans-1,4 _____ 0.6
1,2-vinyl _____ 0.4

Example 13

After being flashed with de-moisturized nitrogen, a sufficiently dried glass tube was charged with Co-chelate, 35 mols of toluene and diethyl aluminum chloride, successively. To this system of reaction mixture, 5 ml. of isoprene were added and the reaction was carried out in a stream of nitrogen. Obtained data are shown in Table 5.

TABLE 5

| Run No. | Co-chelate compound | | AlEt$_2$Cl (mmol) | Total reaction time (hr.) | Polymer yield (g.) | $[\mu]$ | Microstructure, mol percent | |
|---|---|---|---|---|---|---|---|---|
| | Type | Amount (mmol) | | | | | 1-4 | 3-4 |
| 1 | Bis(8-hydroxyquinoline)Co$^{II}$ | 0.49 | 2.45 | 60 | 3.3 | 0.40 | 60.1 | 39.9 |
| 2 | Bis(salicylaldehyde)Co$^{II}$ | 0.05 | 2.5 | 2 | 2.0 | 0.44 | 58.8 | 45.2 |
| 3 | Bis(mercaptobenzoimidazole)Co$^{II}$ | 0.05 | 2.5 | 3 | 1.5 | | 61.8 | 38.2 |

Example 14

After being flashed with de-moisturized nitrogen, a sufficiently dried glass tube was charged with Co-chelate, 35 ml. of toluene, and 5 ml. of 1,3-pentadiene, successively. After being cooled in an ice bath, this reaction mixture was admixed with diethylaluminum chloride. The polymerization was carried out for 3 hrs. after the reaction temperature was returned to room temperature. Data are shown in Table 6.

TABLE 6

| Run No. | Co-chelate compound | | Toluene (ml.) | AlEt$_2$Cl (mmol) | Polymer yield (g.) | $(\mu)$ | Microstructure (mol percent) | |
|---|---|---|---|---|---|---|---|---|
| | Type | Amount (mmol) | | | | | Cis-vinylene | Trans-vinylene |
| 1 | Bis(salicylaldehydiemine)Co$^{II}$ | 0.035 | 35 | 2.45 | 2.5 | 0.45 | 0 | 100.0 |
| 2 | Bis(salicylaldehyde(Co$^{II}$ | 0.05 | 35 | 2.5 | 1.8 | 1.00 | 22.1 | 77.9 |
| 3 | Bis(mercaptobenzoimidazole)Co$^{II}$ | 0.05 | 20 | 2.5 | 3.5 | | 0 | 100.0 |

Example 15

Co-chelate and toluene were charged in a reaction flask flashed with de-moisturized nitrogen. After cooling this mixture in an ice bath, isoprene was added and then butadiene was introduced in it. After the addition of diethylaluminum chloride, the reaction was carried out for a definite period of time under agitation. The polymerization product was precipitated in methanol, then collected and dissolved in benzene. It was precipitated again in methanol containing a small amount of phenyl-$\beta$-naphthylamine as an antioxidant. The yield of copolymer obtained by such a purification and its microstructure are shown in Table 7.

TABLE 7

| Run No. | Co-chelate compound Type | Co-chelate compound Amount (mmol) | Toluene (ml.) | AlEt₂Cl (mmol) | Diene used Isoprene | Diene used Butadiene | Polymerization time (hr.) In an ice bath | Polymerization time (hr.) Room temp. | Copolymer yield (g.) | [μ] | Content of isoprene in copolymer (percent) | Cis-1,4 | Trans-1,4 | 1,2-vinyl | 1,4-structure | 3,4-structure |
|---|---|---|---|---|---|---|---|---|---|---|---|---|---|---|---|---|
| 1 | Bis(8-hydroxyquinoline)Co^II | 0.29 | 260 | 14.7 | 25 | 5.6 | 3 | 2 | 27 | | | 71.2 | 2.2 | 26.6 | 72.9 | 27.1 |
| 2 | Bis(salicylaldehyde)Co^II | 0.5 | 350 | 25 | 10 | 15 | | 0.5 | 44.9 | 0.76 | 8.1 | 88.5 | 10.5 | 1.0 | 91.0 | 9.0 |
| 3 | Bis(mercaptobenzimidazole)Co^II | 0.05 | 20 | 2.5 | 5 | 2 | | 3 | 3.1 | | 35.0 | 88.5 | 1.0 | 10.5 | 91.0 | 9.0 |

Example 16

A dried glass tube was flashed with nitrogen and charged with 0.05 mmol of bis(mercaptobenzimidazole)Co^II, 5 ml. of 1,3-pentadiene, 20 ml. of toluene, and 4.5 g. of butadiene and finally with 2.5 mmols of diethyl aluminum chloride. The polymerization was carried out at room temperature for 3 hours. Thus 5.8 g. of copolymer was obtained. According to the analytical result of the resulting rubbery copolymer by infrared spectroscopy, an absorption band at 7.26μ, corresponding to the methyl radical of 1,3-butadiene, was observed. Its microstructure was as follows:

|  | Mol percent |
|---|---|
| Cis-vinylene | 84.1 |
| Trans-vinylene | 12.4 |
| Vinyl | 3.5 |

As is apparent from the examples, polymers or copolymers which are valuable as industrial raw materials can be produced efficiently and economically from conjugated diene compounds via polymerization or copolymerization according to the method of the present invention.

As will be apparent to those skilled in the art, many variations and modifications of the invention can be practiced in view of the foregoing disclosure. However, they are believed to come within the spirit and scope of the invention.

What we claim is:

1. A process for the polymerization of at least one conjugated diolefine which comprises contacting at least one conjugated diolefine with a catalyst composition comprising
   (a) 2 to 300 mols of an organoaluminum halide, and
   (b) one mol of a metal chelate compound in which the metal ion is an ion selected from the group consisting of cobalt and nickel ions and the ligand comprises a chelating agent having a ring selected from the group consisting of aromatic and heterocyclic rings, at least one carbon atom of said ring participating in the formation of the chelate ring of said chelate compound, and the electron donor atoms of said chelating agent being selected from the group consisting of (1) a pair comprising one nitrogen atom and one oxygen atom,
(2) two pairs, each comprising one nitrogen atom and one oxygen atom, and
(3) a pair comprising one nitrogen atom and one sulfur atom.

2. A process according to claim 1 in which the metal chelate compound is a cobalt chelate compound wherein the ligand comprises a chelating agent having a pair comprising one oxygen atom and one nitrogen atom as the electron donor atoms in the molecule, said oxygen atom being contained in a substituent on the aromatic ring, and said nitrogen atom being apart from the oxygen-containing substituent by 2 to 3 carbon atoms, including at least one of the carbon atoms of the aromatic ring.

3. A process according to claim 2 in which said metal chelate compound is bis(salicylaldehydeimine)Co^II.

4. A process according to claim 2 in which said metal chelate compound is tris($\alpha$-nitroso-$\beta$-naphthol)Co^III.

5. A process according to claim 2 in which said metal chelate compound is bis(8-hydroxyquinoline)Co^II.

6. A process according to claim 2 in which said metal chelate compound is bis(anthranilic acid)Co^II.

7. A process according to claim 1 in which the metal chelate compound is a cobalt chelate compound wherein the ligand comprises a chelating agent having a pair comprising one sulfur atom and one nitrogen atom as the electron donor atoms in the molecule, said sulfur atom being contained in a substituent on the ring selected from the group consisting of aromatic and heterocyclic rings, and said nitrogen atom being apart from the oxygen-containing substituent by 1 to 2 carbon atoms, including at least one of the carbon atoms of said rings.

8. A process according to claim 7 in which the metal chelate compound is bis(mercaptobenzimidazole)Co^II.

9. A process according to claim 7 in which the metal chelate compound is bis(mercaptobenzothiazole)Co^II.

10. A process according to claim 7 in which the metal chelate compound is bis(mercaptobenzoxazole)Co^II.

11. A process according to claim 7 in which the metal chelate compound is bis(8-mercaptoquinoline)Co^II.

12. A process according to claim 1 in which the metal chelate compound is a cobalt chelate compound represented by the formula:

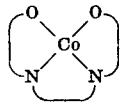

wherein the adjacent O and N are situated apart from each other by 3 carbon atoms including 2 carbon atoms of an aromatic ring, and the two N atoms adjacent are linked through a hydrocarbon radical selected from the group consisting of alkylene and arylene radicals.

13. A process according to claim 12 in which the metal chelate compound is bis(salicylaldehyde)ethylenediimine-Co$^{II}$.

14. A process according to claim 1 in which the organoaluminum halide is selected from the group consisting of dialkyl aluminum halides, alkyl aluminum dihalides, alkyl aluminum sesquihalides, and mixtures thereof.

15. A process for the polymerization of 1,3-butadiene to a high melecular polymer having essentially cis-structure which comprises contacting 1,3-butadiene with a catalyst composition comprising
(a) 2 to 300 moles of an organoaluminum halide and
(b) one mole of a metal chelate compound in which the metal ion is an ion selected from the group consisting of cobalt and nickel ions and the ligand comprises a chelating agent having a ring selected from the group consisting of aromatic and heterocyclic rings, at least one carbon atom of said ring participating in the formation of the chelate ring of said chelate compound, and the electron donor atoms of said chelating agent being selected from the group consisting of
(1) a pair comprising one nitrogen atom and one oxygen atom,
(2) two pairs, each comprising one nitrogen atom and one oxygen atom, and
(3) a pair comprising one nitrogen atom and one sulfur atom.

16. A process according to claim 15 in which the polymerization of 1,3-butadiene is conducted in the presence of a solvent selected from the group consisting of aromatic, aliphatic and, alicyclic hydrocarbons and mixtures thereof.

17. A process according to claim 16 in which the polymerization of 1,3-butadiene is conducted at a temperature of −20° to 100° C.

18. A process for the polymerization of at least one conjugated diolefine which comprises contacting at least one conjugated diolefine with a catalyst composition comprising
(a) 2 to 300 mols of an organoaluminum halide, and
(b) one mol of bis(quinizarin)Co$^{II}$.

References Cited

UNITED STATES PATENTS

| | | | |
|---|---|---|---|
| 3,135,725 | 6/1964 | Carlson et al. | 260—94.3 |
| 3,296,220 | 1/1967 | Kasting et al. | 260—94.3 |
| 3,297,667 | 1/1967 | Von Dohlen | 260—94.3 |

FOREIGN PATENTS 665,100   Canada.

OTHER REFERENCES

Martel et al.: Chemistry of Metal Chelate Compounds, Prentice-Hall, Inc., New Jersey (1952), QD 411 M38, pp. 502–503.

JOSEPH L. SCHOFER, Primary Examiner.

R. A. GAITHER, Assistant Examiner.

U.S. Cl. X.R.

260—82.1